US012605706B2

(12) United States Patent
Peng et al.

(10) Patent No.: US 12,605,706 B2
(45) Date of Patent: Apr. 21, 2026

(54) DETECTION CHIP, AND MANUFACTURING METHOD AND SAMPLE INTRODUCTION METHOD THEREOF

(71) Applicants: Beijing BOE Technology Development Co., Ltd., Beijing (CN); BOE TECHNOLOGY GROUP CO., LTD., Beijing (CN)

(72) Inventors: Kang Peng, Beijing (CN); Beiyuan Fan, Beijing (CN); Ding Ding, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 966 days.

(21) Appl. No.: 17/772,639

(22) PCT Filed: May 27, 2021

(86) PCT No.: PCT/CN2021/096275
§ 371 (c)(1),
(2) Date: Apr. 28, 2022

(87) PCT Pub. No.: WO2022/246723
PCT Pub. Date: Dec. 1, 2022

(65) Prior Publication Data

US 2024/0165615 A1 May 23, 2024

(51) Int. Cl.
*C12M 1/00* (2006.01)
*B01L 3/00* (2006.01)
(Continued)

(52) U.S. Cl.
CPC ... *B01L 3/502723* (2013.01); *B01L 3/502707* (2013.01); *B01L 2200/0642* (2013.01);
(Continued)

(58) Field of Classification Search
None
See application file for complete search history.

(56) References Cited

U.S. PATENT DOCUMENTS

2003/0124599 A1 7/2003 Chen
2018/0221877 A1* 8/2018 Goto ................ B01L 3/502715
(Continued)

FOREIGN PATENT DOCUMENTS

CN 102899245 A * 1/2013
CN 102994369 A 3/2013
(Continued)

OTHER PUBLICATIONS

Chuan, Yang, "Brush-Like Polycarbonates Containing Dopamine, Cations, and PEG Providing a Broad-Spectrum, Antibacterial, and Antifouling Surface via One-Step Coating" Advanced Materials, 2014, 26 (Year: 2014).*
(Continued)

*Primary Examiner* — Maris R Kessel
*Assistant Examiner* — Madison T. Herbert
(74) *Attorney, Agent, or Firm* — HOUTTEMAN LAW LLC

(57) ABSTRACT

The present disclosure provides a detection chip, including: a micro-cavity-defining layer having a plurality of micropores extending through the micro-cavity-defining layer are arranged; and a ventilative liquid-resistant layer on a side of the micro-cavity-defining layer and completely covering openings on a side of the plurality of micro-pores. The ventilative liquid-resistant layer is configured to allow gas to pass therethrough and to block liquid from passing therethrough. The present disclosure also provides a method for manufacturing a detection chip and a sample introduction method for the detection chip.

19 Claims, 7 Drawing Sheets

(51) Int. Cl.
*C12M 1/14* (2006.01)
*C12Q 1/686* (2018.01)
*G01N 33/53* (2006.01)

(52) U.S. Cl.
CPC .................. *B01L 2200/0684* (2013.01); *B01L 2300/0645* (2013.01); *B01L 2300/0816* (2013.01); *B01L 2300/161* (2013.01); *B01L 2300/1827* (2013.01)

(56) References Cited

U.S. PATENT DOCUMENTS

| | | | | |
|---|---|---|---|---|
| 2018/0223353 | A1* | 8/2018 | Ball | C12Q 1/6869 |
| 2018/0296732 | A1* | 10/2018 | Kutryk | A61L 15/26 |
| 2019/0211396 | A1* | 7/2019 | Chiang | C12Q 1/6876 |
| 2020/0023363 | A1* | 1/2020 | Stahl | G01N 1/34 |

FOREIGN PATENT DOCUMENTS

| | | | | | |
|---|---|---|---|---|---|
| CN | 107513495 | A | | 12/2017 | |
| CN | 108126766 | A | * | 6/2018 | B01L 3/502707 |
| CN | 108660068 | A | | 10/2018 | |
| WO | 2020199016 | A1 | | 10/2020 | |
| WO | 2021092798 | A1 | | 5/2021 | |

OTHER PUBLICATIONS

Park, Ji Young, "Dopamine-Assisted Synthesis of Carbon-Coated Silica for PCR Enhancement" Applied Materials and Interfaces, 2015, vol. 7 (Year: 2015).*

Qingchang Tian, "Studies on Integrated Digital PCR microfluidic devices for Nucleic acids Purification, Amplification and Detection," Doctoral Dissertation, Aug. 15, 2016, Zhejiang University, Zhejiang, China. English Abstract.

* cited by examiner

DETECTION CHIP, AND MANUFACTURING METHOD AND SAMPLE INTRODUCTION METHOD THEREOF

This is a National Phase Application filed under 35 U.S.C. 371 as a national stage of PCT/CN2021/096275, filed on May 27, 2021.

TECHNICAL FIELD

Embodiments of the present disclosure relate to a detection chip, a manufacturing method for a detection chip and a sample introduction method for a detection chip.

BACKGROUND

Polymerase chain reaction (PCR) is a classic molecular biology experimental technology for synthesizing a large amount of target DNA fragments in vitro through an enzyme catalysis, has characteristics of strong specificity, high sensitivity, simple and convenient operation and the like, and is not only applied to basic research fields of gene cloning, sequence analysis and the like, but also is widely applied to medical fields of disease diagnosis, pathogen detection and the like.

SUMMARY

In a first aspect, an embodiment of the present disclosure provides a detection chip, including: a micro-cavity-defining layer having a plurality of micro-pores extending through the micro-cavity-defining layer are arranged; and a ventilative liquid-resistant layer on a side of the micro-cavity-defining layer and completely covering openings of the plurality of micro-pores on a side of the plurality of micro-pores, wherein the ventilative liquid-resistant layer is configured to allow gas to pass therethrough and to block liquid from passing therethrough.

In some embodiments, the detection chip further includes: a modification layer including first portions covering side walls of the plurality of micro-pores and a second portion covering a side of the micro-cavity-defining layer away from the ventilative liquid-resistant layer, wherein the first portion has a surface energy greater than that of the second portion.

In some embodiments, a material of the first portion includes a hydrophilic polymer; and a material of the second portion includes a hydrophilic polymer and an organic polymer on a side of the hydrophilic polymer away from the micro-cavity-defining layer and grafted with the hydrophilic polymer.

In some embodiments, the hydrophilic polymer includes dopamine; and the organic polymer includes polyethylene glycol.

In some embodiments, the detection chip further includes: a first substrate on a side of the ventilative liquid-resistant layer away from the micro-cavity-defining layer, wherein the first substrate includes a gas outlet, and a portion of a surface of the ventilative liquid-resistant layer covering the plurality of micro-pores and away from the micro-cavity-defining layer is communicated with the gas outlet.

In some embodiments, the detection chip further includes: an encapsulation spacer between the first substrate and the ventilative liquid-resistant layer, wherein one end of the encapsulation spacer is in contact with the first substrate, and the other end of the encapsulation spacer is in contact with the ventilative liquid-resistant layer; the micro-cavity-defining layer includes a reaction region and a peripheral region surrounding the reaction region; the plurality of micro-pores are in the reaction region; and an orthographic projection of the encapsulation spacer on the micro-cavity-defining layer is in the peripheral region and is in a closed pattern surrounding the reaction region.

In some embodiments, the first substrate includes a base substrate, and the encapsulation spacer and the base substrate are formed as a single piece.

In some embodiments, the first substrate includes: a base substrate having the gas outlet therein; and a heating electrode on a side of the base substrate close to the ventilative liquid-resistant layer, wherein an orthographic projection of the heating electrode on the base substrate does not overlap with an orthographic projection of the gas outlet on the base substrate, and the heating electrode is configured to heat the micro-pore.

In some embodiments, the first substrate further includes: an insulating layer between the base substrate and the heating electrode, wherein an orthographic projection of the insulating layer on the base substrate does not overlap with the orthographic projection of the gas outlet on the base substrate; and a control electrode between the base substrate and the insulating layer, wherein an orthographic projection of the control electrode on the base substrate does not overlap with the orthographic projection of the gas outlet on the base substrate, the control electrode is electrically connected to the heating electrode through a via in the insulating layer, and the control electrode is configured to transmit an external electric signal to the heating electrode.

In some embodiments, the first substrate further includes: a protective layer between the heating electrode and the encapsulation spacer, wherein an orthographic projection of the protective layer on the base substrate completely covers the orthographic projection of the heating electrode on the base substrate, and does not overlap with the orthographic projection of the gas outlet on the base substrate, and the protective layer and the ventilative liquid-resistant layer are separated from each other.

In some embodiments, the gas outlet has an aperture in a range of 0.5 mm to 1.5 mm.

In some embodiments, the encapsulation spacer has a thickness in a range of 0.1 mm to 0.3 mm.

In some embodiments, the detection chip further includes: a second substrate on a side of the micro-cavity-defining layer away from the ventilative liquid-resistant layer; a liquid sealing groove on a side of the second substrate close to the micro-cavity-defining layer; and a liquid inlet and a liquid outlet at a bottom of the liquid sealing groove and extending through the second substrate, wherein the plurality of micro-pores are communicated with the liquid inlet and the liquid outlet.

In some embodiments, the ventilative liquid-resistant layer has a thickness in a range of 0.05 mm to 0.15 mm.

In some embodiments, a material of the ventilative liquid-resistant layer includes polytetrafluoroethylene.

In a second aspect, an embodiment of the present disclosure further provides a method for manufacturing the detection chip as provided in the first aspect, including: forming the micro-cavity-defining layer and the ventilative liquid-resistant layer, respectively, wherein the plurality of micro-pores extending through the micro-cavity-defining layer are provided in the micro-cavity-defining layer; and the ventilative liquid-resistant layer is configured to allow gas to pass therethrough and to block liquid from passing therethrough; and fixing the ventilative liquid-resistant layer on a side of the micro-cavity-defining layer, wherein the ventilative liquid-resistant layer completely covers openings of the plurality of micro-pores on a side of the plurality of micro-pores.

In some embodiments, after the step of forming the micro-cavity-defining layer and before the step of fixing the ventilative liquid-resistant layer on the side of the micro-cavity-defining layer, the manufacturing method further includes: forming the modification layer on the micro-cavity-defining layer; wherein the modification layer includes: first portions covering side walls of the micro-pores and a second portion covering a side of the micro-cavity-defining layer, wherein the first portion has a surface energy greater than that of the second portion; and in the step of fixing the ventilative liquid-resistant layer on the side of the micro-cavity-defining layer, the ventilative liquid-resistant layer is fixed on a side of the micro-cavity-defining layer away from the second portion.

In some embodiments, the step of forming the modification layer on the micro-cavity-defining layer includes: forming a hydrophilic polymer film on a side of the micro-cavity-defining layer and the side walls of the micro-pores; and forming an organic polymer on the hydrophilic polymer film on the side of the micro-cavity-defining layer, so that the hydrophilic polymer on the side of the micro-cavity-defining layer is grafted with the organic polymer.

In some embodiments, the step of forming the hydrophilic polymer film on the side of the micro-cavity-defining layer and the side walls of the micro-pores includes: immersing the micro-cavity-defining layer in a hydrophilic polymer solution; and taking the micro-cavity-defining layer out of the hydrophilic polymer solution, and drying the micro-cavity-defining layer, to form the hydrophilic polymer film on a surface of the micro-cavity-defining layer and the side walls of the micro-pores.

In some embodiments, the step of forming the organic polymer on the hydrophilic polymer film on the side of the micro-cavity-defining layer includes: coating an organic polymer solution on a support substrate; and placing a side of the micro-cavity-defining layer on the support substrate coated with the organic polymer solution, so that the hydrophilic polymer located on the side of the micro-cavity-defining layer is grafted with the organic polymer.

In a third aspect, an embodiment of the present disclosure further provides a sample introduction method for the detection chip as provided in the first aspect, including: injecting a sample solution into the plurality of micro-pores in the micro-cavity-defining layer; and discharging residual gas in the plurality of micro-pores through the ventilative liquid-resistant layer.

In some embodiments, the detection chip includes a first substrate and a second substrate; the first substrate is on a side of the ventilative liquid-resistant layer away from the micro-cavity-defining layer and has a gas outlet, and a portion of a surface of the ventilative liquid-resistant layer covering the plurality of micro-pores and away from the micro-cavity-defining layer is communicated with the gas outlet; and the second substrate is on a side of the micro-cavity-defining layer away from the ventilative liquid-resistant layer, a liquid sealing groove is formed on a side of the second substrate close to the micro-cavity-defining layer, and a liquid inlet and a liquid outlet are at a bottom of the liquid sealing groove and extend through the second substrate; the micro-pores are communicated with the liquid inlet and the liquid outlet; the step of injecting the sample solution into the plurality of micro-pores in the micro-cavity-defining layer includes: closing the gas outlet, opening the liquid inlet and the liquid outlet, and adding the sample solution through the liquid inlet, such that the solution reaches the liquid outlet; and the step of discharging residual gas in the plurality of micro-pores through the ventilative liquid-resistant layer includes: closing the liquid outlet, opening the gas outlet, and performing a gas pumping process through the gas outlet, so as to discharge the residual gas in the micro-pores through the ventilative liquid-resistant layer.

In some embodiments, after the step of discharging the residual gas in the plurality of micro-pores through the ventilative liquid-resistant layer, the sample introduction method further includes: closing the gas outlet, opening the liquid outlet, and adding an oil phase for liquid seal through the liquid inlet, such that the oil phase for liquid seal reaches the liquid outlet.

DETAIL DESCRIPTION OF EMBODIMENTS

Figure 1:
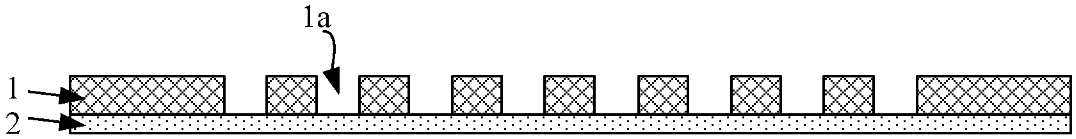
FIG. 1 is a schematic cross-sectional view of a detection chip according to an embodiment of the present disclosure.

In order to enable one of ordinary skill in the art to better understand the technical solutions of the present disclosure, a detection chip, a manufacturing method for a detection chip and a sample introduction method for a detection chip of the present disclosure will be described in further detail with reference to the accompanying drawings.

To make objects, technical solutions and advantages of embodiments of the present disclosure more apparent, the technical solutions of the embodiments of the present disclosure will be clearly and completely described below with reference to the drawings of the embodiments of the present disclosure. It is apparent that the described embodiments are only a few embodiments of the present disclosure, and not all embodiments. All other embodiments, which may be derived by a person skilled in the art from the described embodiments of the present disclosure without inventive step, are within the scope of protection of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Digital polymerase chain reaction PCR (dPCR for short) is a third generation of quantitative analysis technology for nucleic acid molecules which has been rapidly developed in recent years, and a principle thereof is to uniformly distribute a sample to tens of thousands of different reaction units, wherein each reaction unit at least contains a copy of a target DNA template; then, a PCR amplification is performed in each reaction unit, and a statistical analysis is performed on fluorescence signals of each reaction unit after the amplification. The dPCR technology is independent of a standard curve, is less influenced by an amplification efficiency, has a good accuracy and a reproducibility, may realize an absolute quantitative analysis, and shows great technical advantages in research fields of nucleic acid detection, identification and the like; compared with a traditional real-time fluorescent quantitative PCR, the dPCR technology is particularly suitable for copy number variation, rare mutation detection and typing, NGS verification, single cell expression analysis and the like.

At present, the digital PCR is mainly realized in an array mode and a liquid drop mode. Compared with a detection chip for the digital PCR in the liquid drop mode, a detection chip for the digital PCR in the array mode has a more uniform micro-reaction volume, a higher stability and a smaller influence among systems, and is more favorable for obtaining an analysis result with high accuracy. For the detection chip for the digital PCR in the array mode, it is relatively complex to fabricate a micro-array, and a sample introduction process of a sample solution on the detection chip (i.e., a process of the sample solution entering each micro-reaction cavity) is not high in efficiency, the sample solution cannot be smoothly filled the whole cavity, or bubbles easily enter in the micro-reaction cavity and cannot be discharged in the filling process, resulting in that the distribution of the sample solution in each micro-reaction cavity is not uniform, adversely influencing the amplification efficiency and a result interpretation, and restricting the application of the detection chip for the digital PCR in the array mode.

At least one embodiment of the present disclosure provides a detection chip, a manufacturing method for a detection chip and a sample introduction method for a detection chip. A ventilative liquid-resistant layer is provided on a side of a micro-cavity-defining layer, is configured to allow gas to pass through the ventilative liquid-resistant layer and preventing (blocking) liquid from passing through the ventilative liquid-resistant layer, and completely covers openings on a side of micro-pores, so that during the sample introduction process, the gas in each micro-reaction cavity is discharged, the sample solution may be filled in the whole micro-reaction cavity, thereby effectively improving the sample introduction efficiency and the uniformity of the sample solution in each micro-reaction cavity. Hereinafter, embodiments of the present disclosure will be described in detail with reference to the accompanying drawings.

Figure 2:
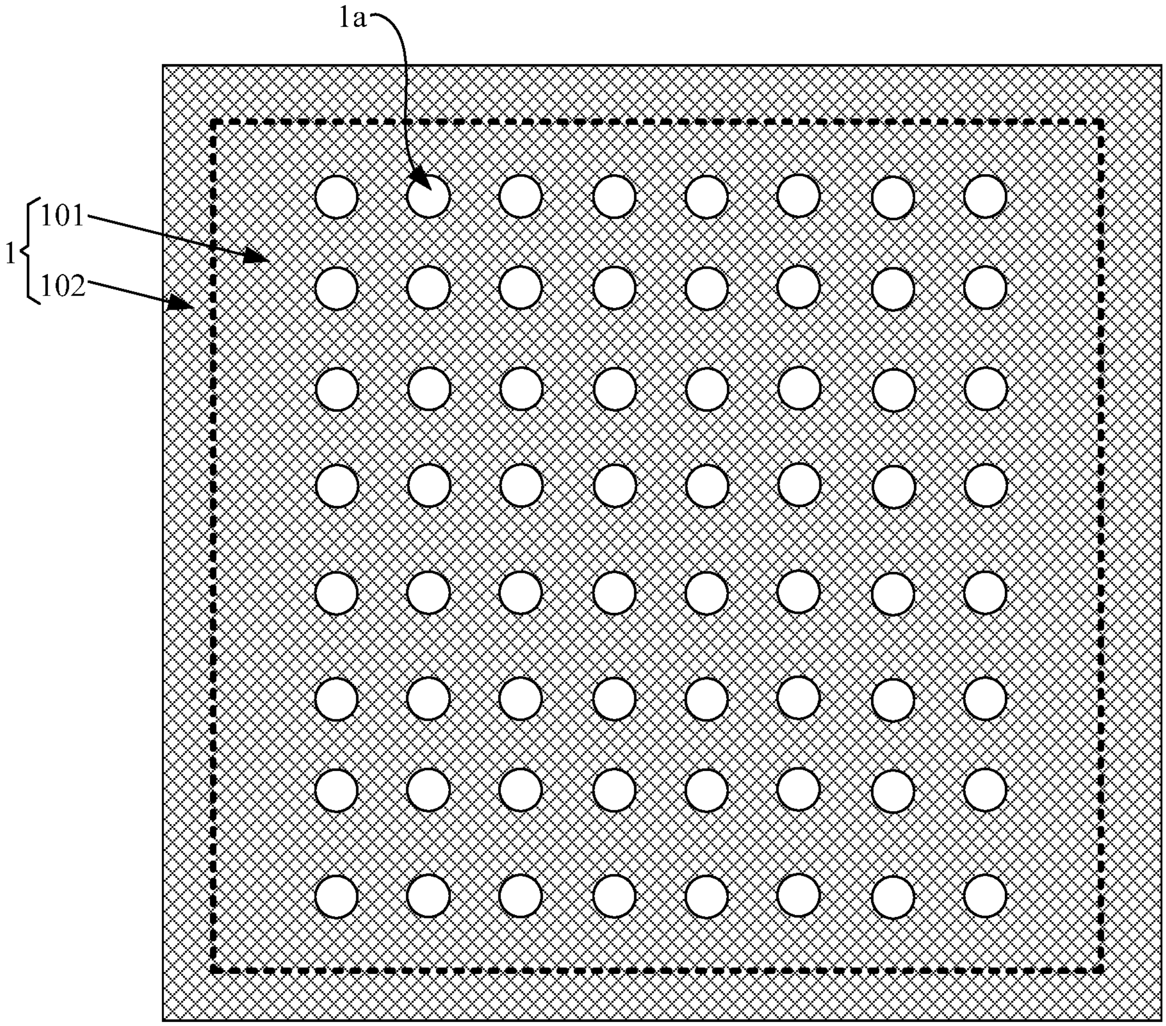
FIG. 2 is a schematic top view of a micro-cavity-defining layer according to an embodiment of the present disclosure.
Figure 3:
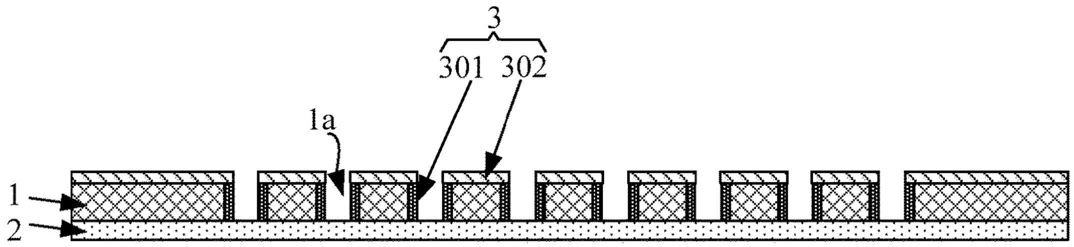
FIG. 3 is another schematic cross-sectional view of a detection chip according to an embodiment of the present disclosure.

FIG. 1 is a schematic cross-sectional view of a detection chip according to an embodiment of the present disclosure; FIG. 2 is a schematic top view of a micro-cavity-defining layer according to an embodiment of the present disclosure. As shown in FIG. 1 and FIG. 2, a detection chip may be used for the polymerase chain reaction (e.g., digital polymerase chain reaction), and may be further used for a detection process after the polymerase chain reaction.

The detection chip includes: a micro-cavity-defining layer 1 and a ventilative liquid-resistant layer 2. The micro-cavity-defining layer 1 is provided with a plurality of micro-pores 1*a* penetrating through the micro-cavity-defining layer 1 in a thickness direction of the micro-cavity-defining layer 1; the ventilative liquid-resistant layer 2 is located on a side of the micro-cavity-defining layer 1 and completely covers openings on a side of the plurality of micro-pores 1*a*, and is configured to allow gas to pass therethrough and to block liquid from passing therethrough.

In an embodiment of the present disclosure, any one micro-pore 1*a* and the ventilative liquid-resistant layer 2 completely covering an opening on a side of the micro-pore 1*a* define a micro-reaction cavity (also referred to as "micro-reaction well"), and an opening on the opposite side of the micro-pore 1*a* is uncovered and may be used for adding a sample solution to the micro-reaction cavity.

In an embodiment of the present disclosure, the ventilative liquid-resistant layer 2 is provided on one side of the openings of the micro-pores 1*a* to form the micro-reaction cavities. The ventilative liquid-resistant layer 2 may be configured to support the sample solution, and may also be configured such that the gas in each micro-reaction cavity is discharged through the ventilative liquid-resistant layer 2, and the sample solution may be filled in the whole micro-reaction cavity, thereby effectively improving the sample introduction efficiency and the uniformity of the sample solution in each micro-reaction cavity.

In the embodiment of the present disclosure, the micro-cavity-defining layer 1 may be selected from polydimethylsiloxane (PDMS), polymethyl methacrylate (PMMA), polycarbonate (PC), glass, or the like. The micro-cavity-defining layer I may be formed by etching or laser drilling glass, or by etching a photoresist layer, or by a direct injection molding process.

Shapes of respective micro-pores 1*a* in the micro-cavity-defining layer I may be the same or different, and may be specifically set as needed. In some embodiments, a three-dimensional shape of each micro-pore 1*a* is a cylinder, such as a circular cylinder, a triangular prism, a quadrangular prism, or the like. In addition, a distribution of the plurality of micro-pores 1*a* in the micro-cavity-defining layer 1 may also be set as needed. The technical solution of the present disclosure does not limit the shape, the number and the distribution of the micro-pores 1*a*.

In addition, if an aperture of each micro-pore 1*a* is too small, the difficulty for layer 1 away from the ventilative liquid-resistant layer 2, and each first portion 301 has a surface energy greater than that of the second portion 302. In the embodiment of the present disclosure, the surface energy of the first portion 301 is relatively large and the surface energy of the second portion 302 is relatively small. The first portion 301 has better hydrophilicity than the second portion 302, which is beneficial for the sample solution to enter each micro-reaction cavity; the second portion 302 has better hydrophobicity than the first portion 301, which is beneficial for adsorption of an oil phase for liquid seal (described in detail later) and preventing the sample solution in different micro-reaction cavities from interfering with each other.

In some embodiments, a material of the first portion 301 includes: a hydrophilic polymer; a material of the second portion 302 includes: a hydrophilic polymer and an organic polymer which is located on a side of the hydrophilic polymer away from the micro-cavity-defining layer 1 and grafted with the hydrophilic polymer. In some embodiments, the hydrophilic polymer in the first portion 301 and in the second portion 302 are different portions of the same hydrophilic polymer film.

Further, optionally, the hydrophilic polymer includes: dopamine; the organic polymer includes: polyethylene glycol. In the second portion 302, a surface of the second portion 302 may show hydrophobic by grafting the polyethylene glycol to a surface of the dopamine for surface modification.

It should be noted that in the embodiment of the present disclosure, the first portion 301 and the second portion 302 may be formed in other manners such that the surface energy of each first portion 301 is larger than that of the second portion 302, which will not be described by way of example.

Figure 4:
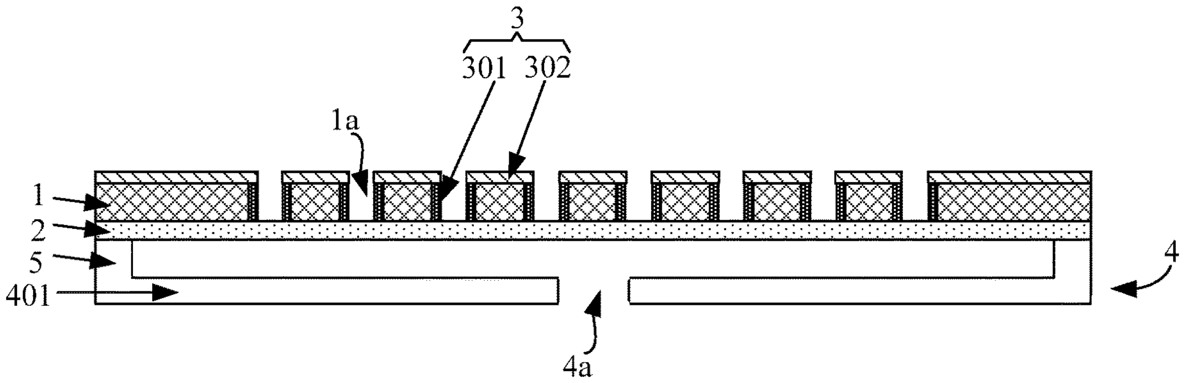
FIG. 4 is another schematic cross-sectional view of a detection chip according to an embodiment of the present disclosure.
Figure 5:
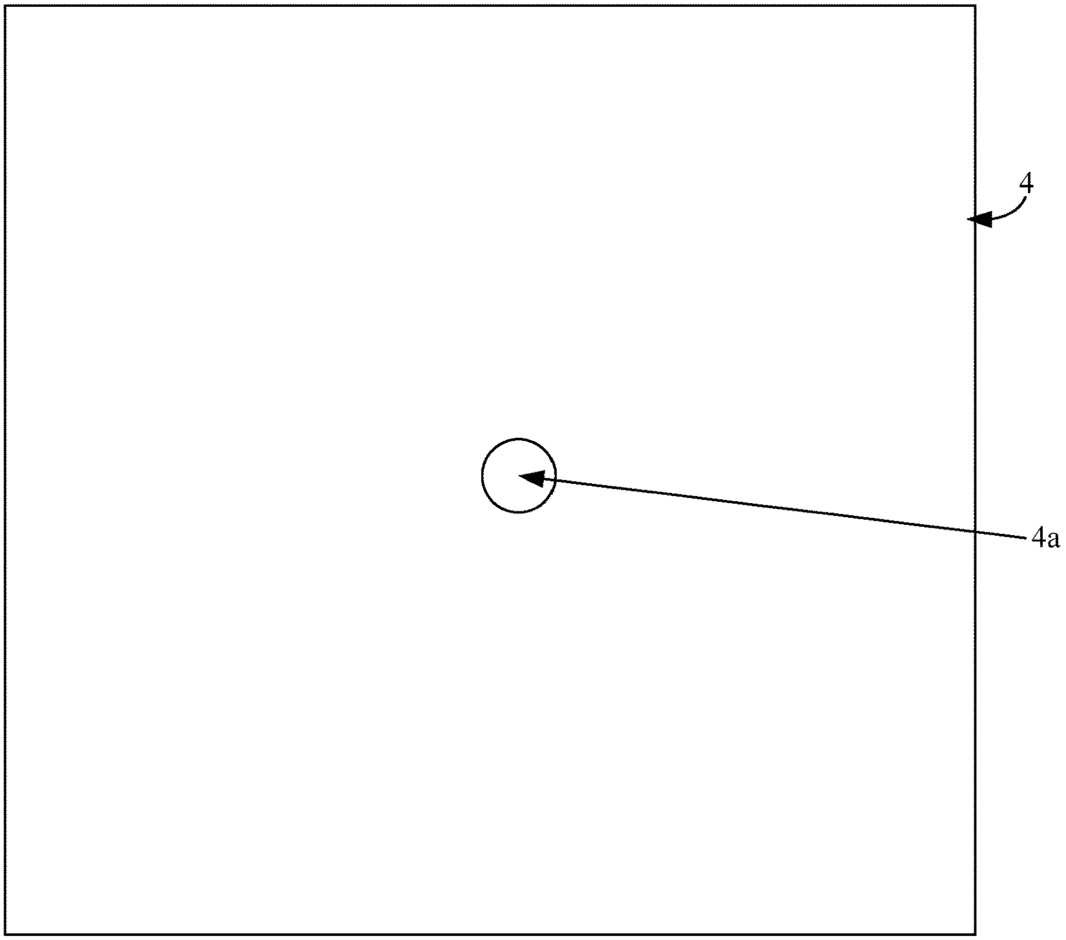
FIG. 5 is a schematic top view of a first substrate according to an embodiment of the present disclosure.

FIG. 4 is another schematic cross-sectional view of a detection chip according to an embodiment of the present disclosure; FIG. 5 is a schematic top view of a first substrate according to an embodiment of the present disclosure. As shown in FIG. 4 and FIG. 5, the detection chip includes a first substrate 4, in addition to the micro-cavity-defining layer 1 and the ventilative liquid-resistant layer 2. The first substrate 4 is located on a side of the ventilative liquid-resistant layer 2 away from the micro-cavity-defining layer 1, a gas outlet 4*a* is formed in the first substrate 4, and portions of a surface of the ventilative liquid-resistant layer 2 covering the corresponding micro-pores 1*a* and facing away from the micro-cavity-defining layer 1 is communicated with the gas outlet 4*a*. In the embodiment of the present disclosure, the first substrate 4 may have a support function.

An aperture of the gas outlet 4*a* may be set as needed. In the embodiment of the present disclosure, the aperture of the gas outlet 4*a* is in a range of 0.5 mm to 2 mm. As an example, the aperture of the gas outlet 4*a* is 1 mm.

In some embodiments, the detection chip further includes: an encapsulation spacer 5 positioned between the first substrate 4 and the ventilative liquid-resistant layer 2, one end of the encapsulation spacer 5 is in contact with the first substrate 4, and the other end of the encapsulation spacer 5 is in contact with the ventilative liquid-resistant layer 2; the micro-cavity-defining layer 1 includes a reaction region and a peripheral region surrounding the reaction region; the micro-pores 1*a* are located in the reaction region; an orthographic projection of the encapsulation spacer 5 on the micro-cavity-defining layer 1 is located in the peripheral region and is in a closed pattern surrounding the reaction region. In this way, the first substrate 4, the ventilative liquid-resistant layer 2 and the encapsulation spacer 5 may define an exhaust channel communicated with the gas outlet 4*a*. A gas pumping process is performed on the gas outlet 4*a* (so that the exhaust channel has certain vacuum degree), so that the gas in the micro-reaction cavity is easily discharged during introducing liquid.

With continued reference to FIG. 4, the first substrate 4 includes a base substrate 401. A material of the base substrate 401 includes: PMMA, PC rigid plastic or glass. In some embodiments, the encapsulation spacer 5 and the base substrate 401 are formed as a single piece by etching a glass or photoresist layer, or by a direct injection molding process.

Figure 6:
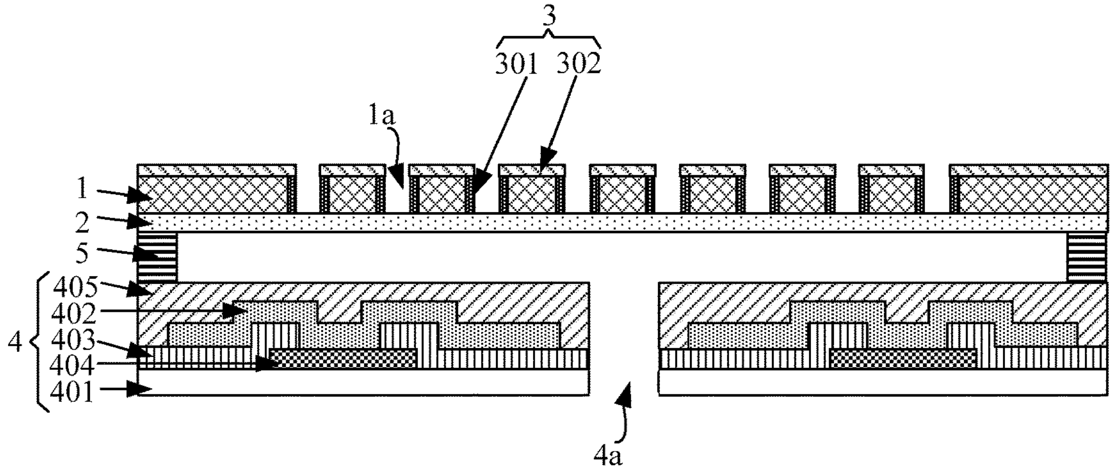
FIG. 6 is another schematic cross-sectional view of a detection chip according to an embodiment of the present disclosure.

FIG. 6 is another schematic cross-sectional view of a detection chip according to an embodiment of the present disclosure. As shown in FIG. 6, in some embodiments, the first substrate 4 includes: the base substrate 401 and heating electrodes 402; the gas outlet 4*a* is provided in the base substrate 401, the heating electrodes 402 are located on a side of the base substrate 401 close to the ventilative liquid-resistant layer 2, and an orthographic projection of the heating electrodes 402 on the base substrate 401 does not overlap a region where the gas outlet 4*a* is located, and the heating electrodes 402 are configured to heat the micro-pores 1*a*.

During the PCR reaction, a double-strand structure of DNA fragments is denatured at a high temperature to form a single-strand structure, a primer and a single strand are combined at a low temperature according to a complementary base pairing principle, and base combination and extension are realized at a temperature most suitable for the DNA polymerase, which is a temperature cycle process of denaturation-annealing-extension. Through a plurality of temperature cycle processes of denaturation-annealing-extension, a mass replication for the DNA fragments may be realized. In order to realize the above temperature cycle process, a series of external devices are usually required to heat and cool the detection chip, resulting in that the device is large in size, complex to operate and high in cost. In addition, in the process of heating and cooling the detection chip, an overall temperature of the detection chip changes, a temperature of other structures and components except the micro-cavity containing the DNA fragments in the detection chip also changes, resulting in that a damage risk of components such as circuits is increased. The general dPCR product is mostly matched with a liquid drop manufacturing system, resulting in that the detection chip is high in cost and complex to operate.

In order to overcome the technical problems, in the embodiment of the present disclosure, the heating electrodes 402 are disposed in the first substrate 4, so as to effectively control a temperature of the micro-reaction cavities, effectively control a temperature of a micro-reaction cavity of the detection chip, realize temperature cycle without driving the liquid drop. It does not require external heating devices, it has a high integration level, it is simple to operate and low in cost, and realizes effective sample introduction.

The heating electrodes 402 may receive an electrical signal such that when an electrical current flows through the heating electrodes 402, heat is generated and conducted to at least some micro-reaction cavities for regulating a temperature of the micro-reaction cavities. The heating electrodes 402 may be made of a conductive material with a relatively high resistivity, so that the heating electrodes 402 generate relatively high heat when a relatively low electrical signal is provided to the heating electrodes 402, thereby improving an energy conversion rate. In some embodiments, the heating electrodes 402 may be made of a transparent conductive material, such as indium tin oxide (ITO), tin oxide, etc., or may be made of other suitable materials, such as metal, etc., which is not limited in the embodiments of the present disclosure.

In the embodiment of the present disclosure, each heating electrode 402 may be a planar electrode, for example, a conductive material is uniformly formed on the base substrate 401, so that the plurality of micro-reaction cavities are uniformly heated. Alternatively, the embodiments of the present disclosure are not limited thereto, and the heating electrodes 402 may also have a specific pattern, such as a zigzag, a circular arc, etc., which may be determined according to a distribution of the plurality of micro-reaction cavities.

In some embodiments, the first substrate 4 further includes: an insulating layer 403 and a control electrode 404; the insulating layer 403 is located between the base substrate 401 and the heating electrodes 402, and an orthographic projection of the insulating layer 403 on the base substrate 401 does not overlap with the region where the gas outlet 4*a* is located; the control electrode 404 is located between the base substrate 401 and the insulating layer 403, and an orthographic projection of the control electrode 404 on the base substrate 401 does not overlap with the region where the gas outlet 4*a* is located, the control electrode 404 is electrically connected to the corresponding heating electrode 402 through a via in the insulating layer 403, and the control electrode 404 is configured to transmit and apply an external electric signal to the corresponding heating electrode 402.

The control electrode 404 may include one or more control electrodes 404, which is not limited by the embodiments of the present disclosure. When a plurality of control electrodes 404 are used to apply the electric signal to the heating electrodes 402, different portions of the heating electrodes 402 may receive the electric signal at the same time, so that the heating of the heating electrodes 402 is more uniform. For example, when the control electrode 404 includes a plurality of control electrodes 404, the first insulating layer 403 may include a plurality of vias each exposing a portion of a control electrode 404, so that the heating electrodes 402 are electrically connected to the plurality of control electrodes 404 through the plurality of vias, respectively. For example, the plurality of control electrodes 404 are in one-to-one correspondence with the plurality of vias. For another example, the number of the plurality of vias may be greater than the number of the plurality of control electrodes 404, and each control electrode 404 is electrically connected to the heating electrodes 402 through one or more vias.

The control electrode 404 may be made of a material having a relatively low resistivity, thereby reducing energy loss on the control electrode 404. The control electrode 404 may be made of a metal material, which may be, for example, copper or copper alloy, aluminum or aluminum alloy, etc., and may be a single metal layer or a composite metal layer, which is not limited by the embodiments of the present disclosure.

In some embodiments of the present disclosure, the heating electrode 402 is made of indium tin oxide (ITO) or tin oxide and the control electrode 404 is made of a metal material. ITO is not easily oxidized, which prevents a portion of each heating electrode 402 exposed to air from being oxidized, and thus may avoid problems such as uneven heating or increased power consumption caused by oxidation of each heating electrode 402. The control electrode 404 is covered by the insulating layer 403, so that the control electrode 404 is not easily oxidized even if the control electrode 404 is made of a metal material.

In order that the control electrode 404 is electrically connected to an external device configured to provide an electrical signal to receive the electrical signal, the control electrode 404 may further include a contact portion extending to an edge of the base substrate 401 and not covered by the insulating layer 403. For example, a shape of the contact portion is a large-sized square, so that the contact portion is easily in contact and connection with a probe or an electrode in the device configured to provide an electrical signal, and the contact area is large so as to stably receive the electric signal. In this way, the detection chip may realize plug and play, and is simple to operate and convenient to use. For example, when the control electrode 404 is made of a metal material, the contact portion may be subjected to processes including plating, thermal spraying, or vacuum plating, or the like, thereby forming a protection on a surface of the contact portion to prevent the contact portion from being oxidized without affecting its conductive properties.

In some embodiments, the first substrate 4 further includes: a protective layer 405 positioned between the heating electrodes 402 and the encapsulation spacer 5, an orthographic projection of the protective layer 405 on the base substrate 401 completely covers orthographic projections of the heating electrodes 402 on the base substrate 401, and does not overlap the region where the gas outlet 4*a* is located, and the protective layer 405 and the ventilative liquid-resistant layer 2 are spaced apart from each other.

Unlike the case shown in FIG. 4, the encapsulation spacer 5 in FIG. 6 and the base substrate 401 are not formed as a single piece, and the encapsulation spacer 5 is an adhesive tape with a certain thickness, such as a double-sided tape or an ultraviolet curing tape.

In the embodiment of the present disclosure, an orthographic projection of layers, which are located on the base substrate 401 in the first substrate 4, on the base substrate 401 does not overlap with the region where the gas outlet 4*a* is located, so as to ensure the communication between the exhaust channel and the gas outlet 4*a*.

It should be noted that in the detection chip shown in FIG. 4, the heating electrodes 402, the insulating layer 403, the control electrode 404, and/or the protective layer 405 and the like may be selectively provided in a recess than the single piece formed by the encapsulation spacer 5 and the base substrate 401, which is also within the scope of the present disclosure.

In a case where the gas outlet 4*a* is provided in the base substrate 401, if the aperture of the gas outlet 4*a* is too large, an area of a structure (for example, the heating electrodes 402, the insulating layer 403, the control electrode 404, the protective layer 405, and the like) provided on the base substrate 401 is adversely affected; if the aperture of the gas outlet 4*a* is too small, the venting efficiency is adversely affected. In view of the above, referring to FIGS. 4 and 6, in some embodiments, the aperture of the gas outlet 4*a* is in a range of 0.5 mm to 1.5 mm.

If a thickness of the encapsulation spacer 5 is too large, an overall thickness of the detection chip is too large, which is not beneficial to lightening and thinning of a product; if the thickness of the encapsulation spacer 5 is too small, a volume of the exhaust channel is too small, which is not beneficial to venting. In view of the above, referring to FIGS. 4 and 6, in some embodiments, the thickness of the encapsulation spacer 5 is in a range of 0.1 mm to 0.3 mm.

Figure 7:
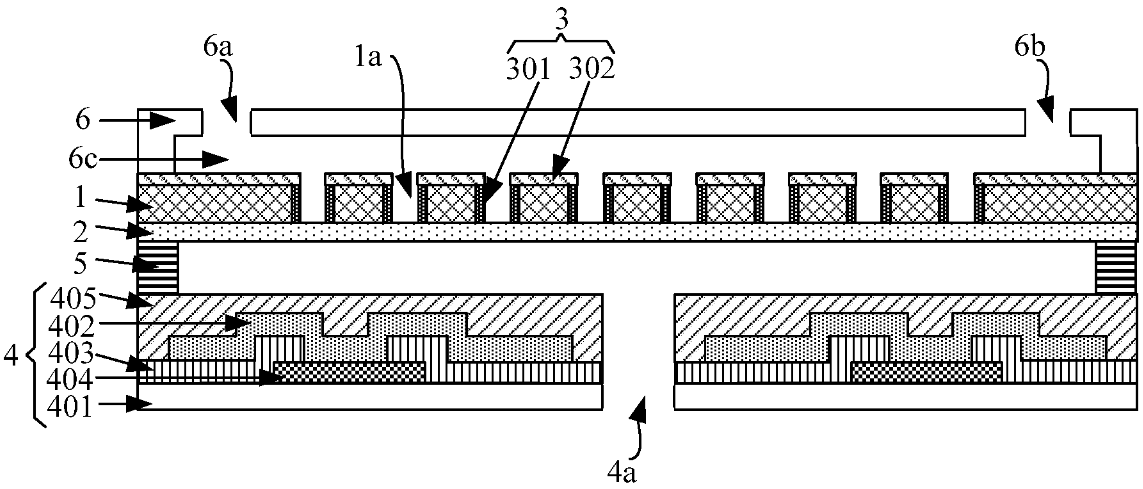
FIG. 7 is another schematic cross-sectional view of a detection chip according to an embodiment of the present disclosure.
Figure 8:
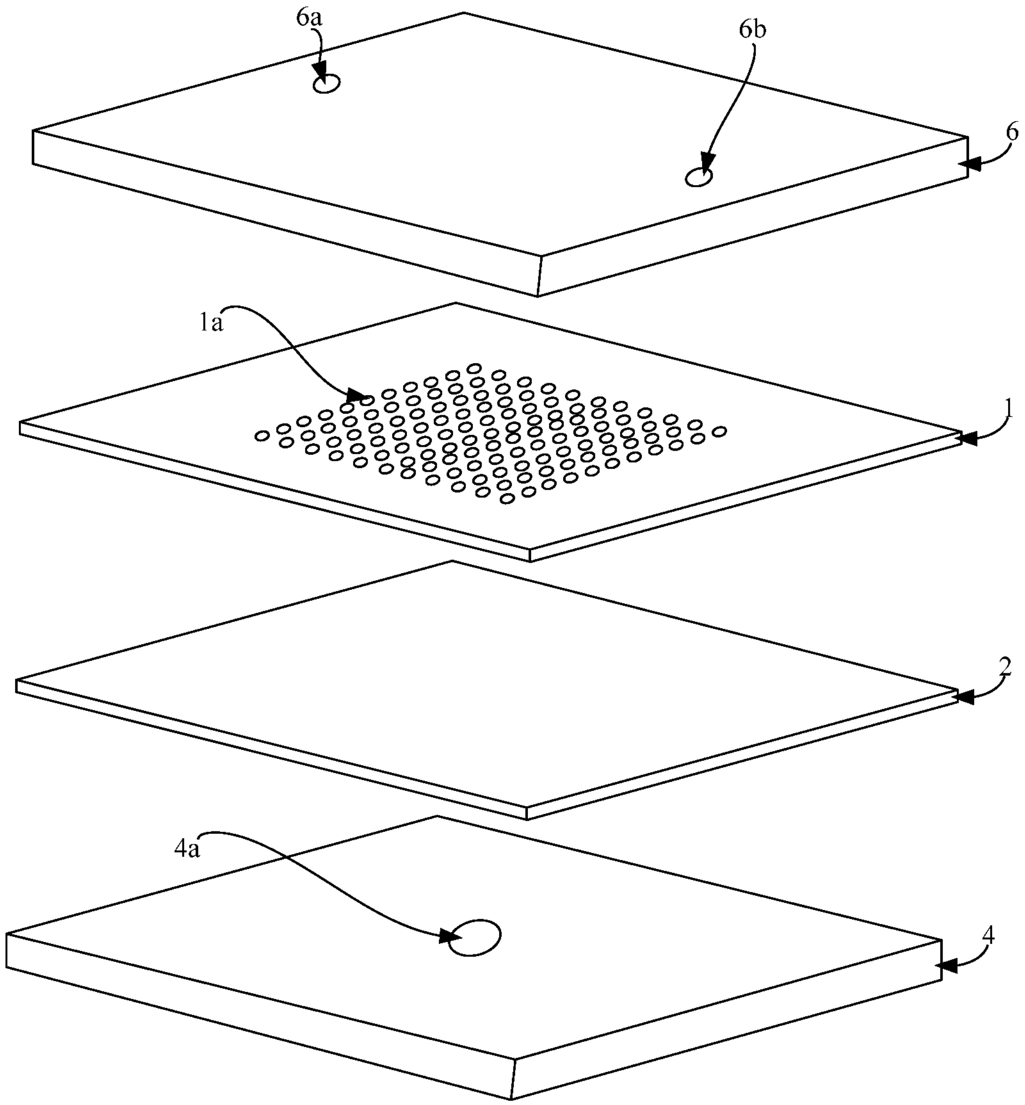
FIG. 8 is an exploded view of the detection chip of FIG. 7.

FIG. 7 is another schematic cross-sectional view of a detection chip according to an embodiment of the present disclosure; FIG. 8 is an exploded view of the detection chip of FIG. 7. As shown in FIG. 7 and FIG. 8, the detection chip shown in FIG. 7 includes a second substrate 6, in addition to the micro-cavity-defining layer 1 and the ventilative liquid-resistant layer 2. The second substrate 6 is positioned on a side of the micro-cavity-defining layer 1 away from the ventilative liquid-resistant layer 2, a liquid sealing groove 6*c* (a groove for liquid seal) is formed on a side of the second substrate 6 close to the micro-cavity-defining layer 1, and a liquid inlet 6*a* and a liquid outlet 6*b* are provided at the bottom of the liquid sealing groove 6*c* and extend through the second substrate 6; and the micro-pores 1*a* are communicated with the liquid inlet 6*a* and the liquid outlet 6*b*.

In some embodiments, the detection chip may further include the modification layer 3, the first substrate 4, the encapsulation spacer 5, and the like in the above embodiments.

In the embodiment of the present disclosure, the second substrate, the micro-cavity-defining layer (which may include the modification layer), the ventilative liquid-resistant layer, and the second substrate may be formed firstly, and then, are combined and encapsulated by a double-sided adhesive, an ultraviolet curing adhesive, or surface treatment with oxygen plasma, or the like.

Figure 9:
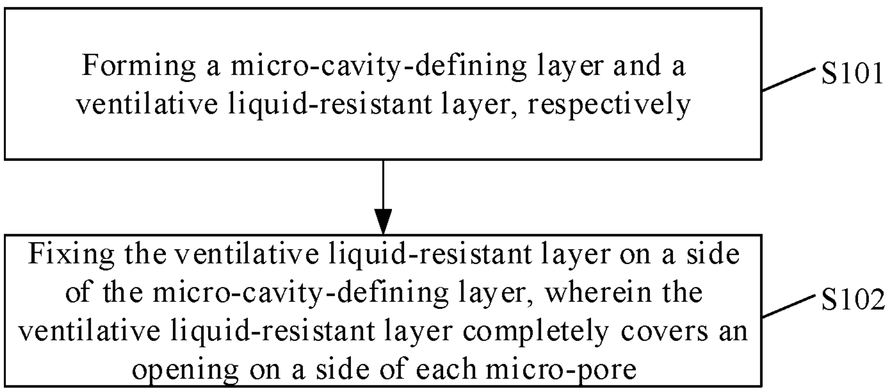
FIG. 9 is a flowchart of a method for manufacturing a detection chip according to an embodiment of the present disclosure.

Based on a same inventive concept, an embodiment of the present disclosure also provides a method for manufacturing the detection chip. FIG. 9 is a flowchart of a method for manufacturing a detection chip according to an embodiment of the present disclosure. As shown in FIG. 9, the method may be used for manufacturing the detection chip according to the above embodiments and include Steps S101 and S102.

Step S101 includes forming a micro-cavity-defining layer and a ventilative liquid-resistant layer, respectively, wherein a plurality of micro-pores extending through the micro-cavity-defining layer are provided in the micro-cavity-defining layer; and the ventilative liquid-resistant layer is configured to allow gas to pass therethrough and to block liquid from passing therethrough.

In some embodiments, the micro-cavity-defining layer may be selected from PDMS, PMMA, PC, glass, and the like; the micro-cavity-defining layer may be formed by etching or laser drilling a glass, or by etching a photoresist layer, or by a direct injection molding process; a thicknesses of the micro-cavity-defining layer is in a range of 0.3 mm to 1 mm; an aperture of each of the micro-pores in the micro-cavity-defining layer is in a range of 0.03 mm to 0.2 mm.

A material of the ventilative liquid-resistant layer includes: polytetrafluoroethylene, a thickness of the ventilative liquid-resistant layer is in a range of 0.05 mm to 0.15 mm.

Step S102 includes fixing the ventilative liquid-resistant layer on a side of the micro-cavity-defining layer, wherein the ventilative liquid-resistant layer completely covers an opening on a side of each micro-pore.

In some embodiments, the ventilative liquid-resistant layer may be fixed on the side of the micro-cavity-defining layer by double-sided adhesive, ultraviolet curing adhesive, or surface treatment with oxygen plasma.

Figure 10:
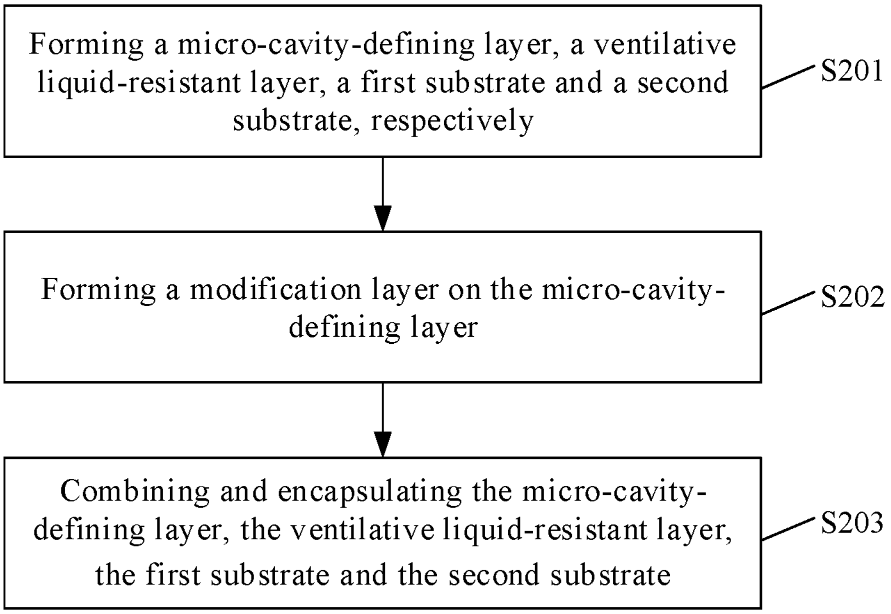
FIG. 10 is a flowchart of another method for manufacturing a detection chip according to an embodiment of the present disclosure.

FIG. 10 is a flowchart of another method for manufacturing a detection chip according to an embodiment of the present disclosure. As shown in FIG. 10, the method may be used for manufacturing the detection chip shown in FIG. 7 and include Steps S201 to S203.

Step S201 includes forming a micro-cavity-defining layer, a ventilative liquid-resistant layer, a first substrate and a second substrate, respectively.

The detailed description of the first substrate and the second substrate may be referred to the corresponding contents in the previous embodiments, and will not be repeated here.

Step S202 includes forming a modification layer on the micro-cavity-defining layer.

The modification layer includes: first portions covering side walls of the micro-pores and second portions covering a side of the micro-cavity-defining layer, and the first portion has a surface energy greater than that of the second portion.

Figure 11:
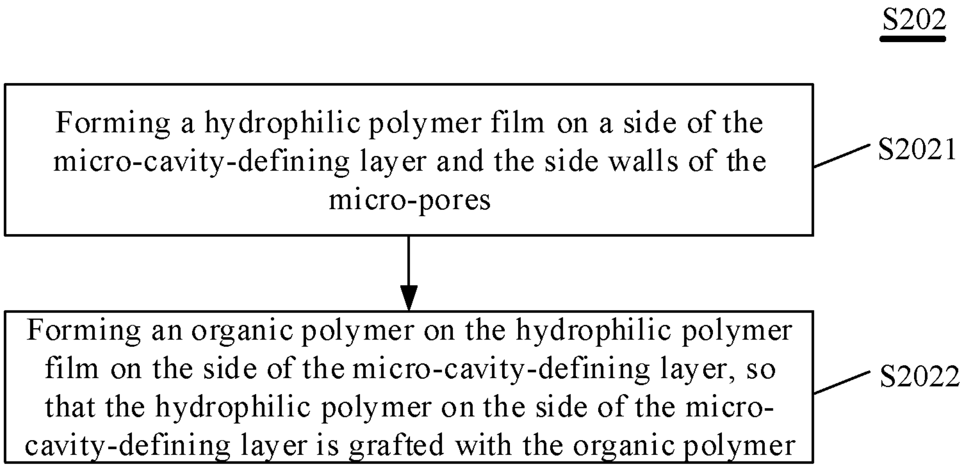
FIG. 11 is a flowchart of an alternative implementation of step S202 according to an embodiment of the present disclosure.

FIG. 11 is a flowchart of an alternative implementation of step S202 according to the embodiment of the present disclosure. As shown in FIG. 11, in some embodiments, step S202 includes Steps S2021 and S2022.

Step S2021 includes forming a hydrophilic polymer film on a side of the micro-cavity-defining layer and the side walls of the micro-pores.

In some embodiments, the step of forming a hydrophilic polymer film specifically includes: immersing the micro-cavity-defining layer in a hydrophilic polymer solution; and taking the micro-cavity-defining layer out of the hydrophilic polymer solution, and drying the micro-cavity-defining layer, to form the hydrophilic polymer film on a surface of the micro-cavity-defining layer and the side walls of the micro-pores.

As an alternative, the micro-cavity-defining layer is immersed in a 2 mg/ml dopamine aqueous solution for a period of time, and is taken out of the solution, and the liquid on a surface of the micro-cavity-defining layer is blow-dried by using a nitrogen gun, to form a dopamine film on the surface of the micro-cavity-defining layer and the side walls of the micro-pores.

Step S2022 includes forming an organic polymer on the hydrophilic polymer film on the side of the micro-cavity-defining layer, so that the hydrophilic polymer on the side of the micro-cavity-defining layer is grafted with the organic polymer.

Figure 12:
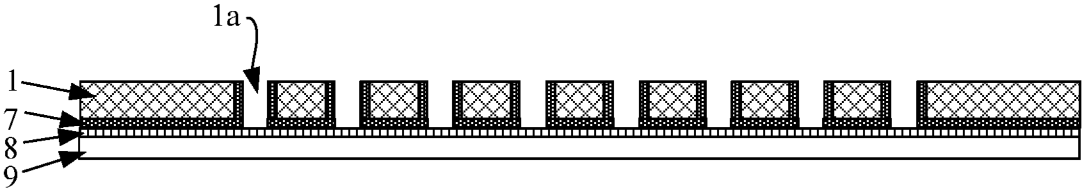
FIG. 12 is a schematic diagram of grafting a hydrophilic polymer on a surface of a micro-cavity-defining layer to an organic polymer according to an embodiment of the present disclosure.

FIG. 12 is a schematic diagram of grafting a hydrophilic polymer to an organic polymer on a surface of a micro-cavity-defining layer according to an embodiment of the present disclosure. As shown in FIG. 12, in some embodiments, the step of forming the organic polymer specifically includes: coating an organic polymer solution 8 on a support substrate 9; placing a side of the micro-cavity-defining layer 1 on the support substrate 9 coated with the organic polymer solution 8, so that the hydrophilic polymer 7 located on a side of the micro-cavity-defining layer 7 is grafted with the organic polymer, and the hydrophilic polymer 7 located on the side walls of the micro-pores 1*a* is not in contact with the organic polymer solution 8.

As an alternative, 1 mg/mL polyethylene glycol solution (solvent is 60% to 70% ethanol) with a molecular weight of about 300 to about 8000 is dripped and coated on a surface of the support substrate, and is slightly blow-dried; and then, a side of the micro-cavity-defining layer is placed on the side of the support substrate coated with the polyethylene glycol solution (still standing and reacting for about 90 min), so that the dopamine on the side of the micro-cavity-defining layer is grafted with the polyethylene glycol; and the support substrate is removed after the reaction is finished, so as to obtain the first portions on the side walls of the micro-pores and the second portions on the side of the micro-cavity-defining layer.

Step S203 includes combining and encapsulating the micro-cavity-defining layer, the ventilative liquid-resistant layer, the first substrate and the second substrate.

The ventilative liquid-resistant layer is fixed on a side of the micro-cavity-defining layer away from the second portion; the first substrate is fixed on a side of the ventilative liquid-resistant layer away from the micro-cavity-defining layer through the encapsulation spacer; and the second substrate is fixed on a side of the micro-cavity-defining layer away from the ventilative liquid-resistant layer.

Figure 13:
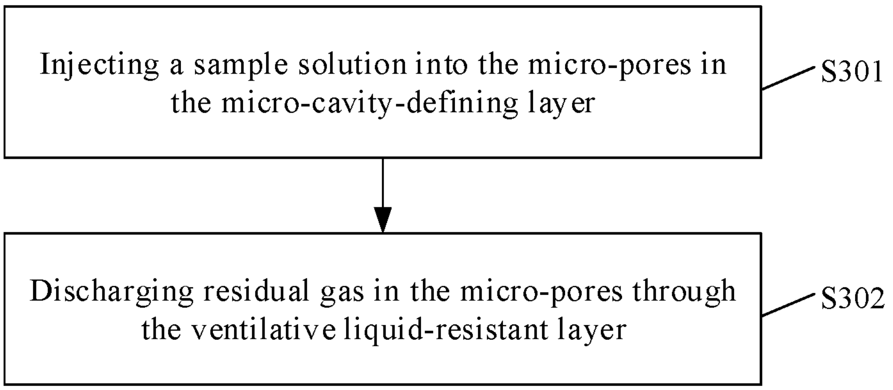
FIG. 13 is a flowchart of a sample introduction method for a detection chip according to an embodiment of the present disclosure.

Based on a same inventive concept, an embodiment of the present disclosure also provides a sample introduction method for the detection chip. FIG. 13 is a flowchart of a sample introduction method for a detection chip according to an embodiment of the present disclosure. As shown in FIG. 13, the detection chip is the detection chip provided in the above embodiments, and the sample introduction method includes Steps 301 and 302.

Step S301 includes injecting a sample solution into the micro-pores in the micro-cavity-defining layer.

Step S302 includes discharging residual gas in the micro-pores through the ventilative liquid-resistant layer.

The ventilative liquid-resistant layer may be configured to support the sample solution, and may also be configured such that the gas in each micro-reaction cavity is discharged through the ventilative liquid-resistant layer, and the sample solution may be filled in the whole micro-reaction cavity, thereby effectively improving the sample introduction efficiency and the uniformity of the sample solution in each micro-reaction cavity.

Figure 14:
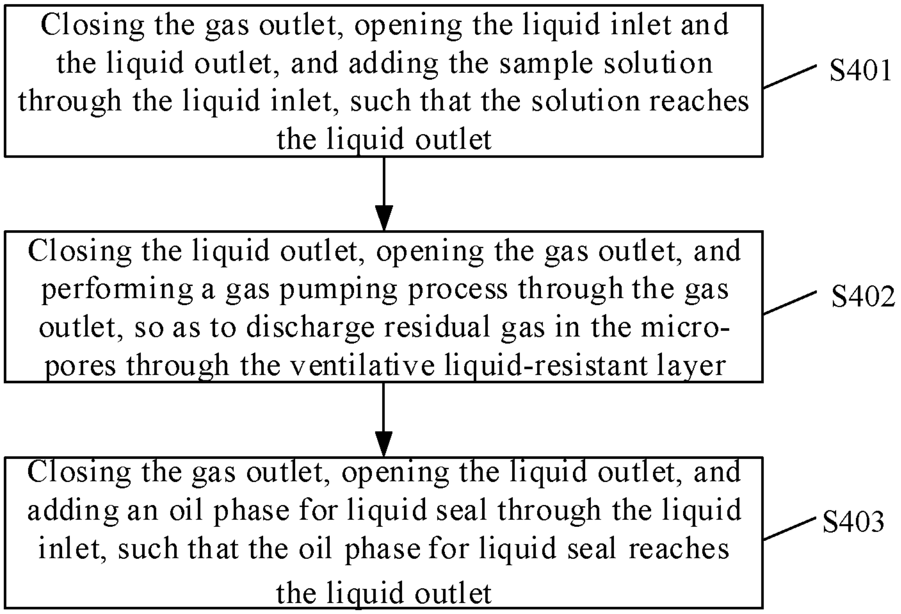
FIG. 14 is a flowchart of another sample introduction method for a detection chip according to an embodiment of the present disclosure.

FIG. 14 is a flowchart of another sample introduction method for a detection chip according to an embodiment of the present disclosure. As shown in FIG. 14, the detection chip includes a first substrate and a second substrate; the first substrate is positioned on a side of the ventilative liquid-resistant layer away from the micro-cavity-defining layer, a gas outlet is formed in the first substrate, and a portion of the surface of the ventilative liquid-resistant layer covering the corresponding micro-pores and away from the micro-cavity-defining layer is communicated with the gas outlet; the second substrate is positioned on a side of the micro-cavity-defining layer away from the ventilative liquid-resistant layer, a liquid sealing groove is formed on a side of the second substrate close to the micro-cavity-defining layer, and a liquid inlet and a liquid outlet are provided at the bottom of the liquid sealing groove and extend through the second substrate; the micro-pores are communicated with the liquid inlet and the liquid outlet. The sample introduction method includes Steps S401 to S403.

Step S401 includes closing the gas outlet, opening the liquid inlet and the liquid outlet, and adding the sample solution through the liquid inlet, such that the solution reaches the liquid outlet.

Step S402 includes closing the liquid outlet, opening the gas outlet, and performing a gas pumping process through the gas outlet, so as to discharge residual gas in the micro-pores through the ventilative liquid-resistant layer.

The sample solution may be filled in the micro-reaction cavity and the liquid sealing groove by the above steps S401 and S402.

Step S403 includes closing the gas outlet, opening the liquid outlet, and adding an oil phase for liquid seal through the liquid inlet, such that the oil phase for liquid seal reaches the liquid outlet.

Because a density of the oil phase for liquid seal is less than that of the sample solution, the oil phase for liquid seal may float upwards, and extrude the sample solution in the liquid sealing groove, to cover an upper opening of each micro-reaction cavity, so that the sample solution in each micro-reaction cavity may be prevented from volatilizing, and the sample solution in different micro-reaction cavities may be prevented from interfering with each other. The oil phase for liquid seal may be mineral oil, liquid paraffin, palmitic acid isopropyl ester, butyl laurate, perfluoroalkane oil, etc.

In a case where the heating electrodes are provided in the first substrate, the heating electrodes may be applied with an electric signal as needed in the sample introduction process, so as to adjust a temperature of the micro-reaction cavities.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A detection chip, comprising:

a micro-cavity-defining layer having a plurality of micro-pores extending through the micro-cavity-defining layer; and a ventilative liquid-resistant layer on a side of the micro-cavity-defining layer and completely covering openings of the plurality of micro-pores on a side of the plurality of micro-pores, wherein the ventilative liquid-resistant layer is configured to allow gas to pass therethrough and to block liquid from passing therethrough, wherein the detection chip further comprises a first substrate on a side of the ventilative liquid-resistant layer away from the micro-cavity-defining layer, the first substrate comprises:

a base substrate having a gas outlet therein, a heating electrode on a side of the base substrate close to the ventilative liquid-resistant layer, an insulating layer between the base substrate and the heating electrode, wherein an orthographic projection of the insulating layer on the base substrate does not overlap with an orthographic projection of the gas outlet on the base substrate; and a control electrode between the base substrate and the insulating layer, wherein an orthographic projection of the control electrode on the base substrate does not overlap with the orthographic projection of the gas outlet on the base substrate, the control electrode is electrically connected to the heating electrode through a via in the insulating layer, and the control electrode is configured to transmit an external electric signal to the heating electrode.

2. The detection chip according to claim 1, further comprising:

a modification layer comprising first portions covering side walls of the plurality of micro-pores and a second portion covering a side of the micro-cavity-defining layer away from the ventilative liquid-resistant layer, wherein the first portion has a surface energy greater than that of the second portion.

3. The detection chip according to claim 2, wherein
a material of the first portion comprises a hydrophilic polymer; and
a material of the second portion comprises a hydrophilic polymer and an organic polymer on a side of the hydrophilic polymer away from the micro-cavity-defining layer and grafted with the hydrophilic polymer.

4. The detection chip according to claim 3, wherein
the hydrophilic polymer of the first and second portions comprises dopamine; and
the organic polymer comprises polyethylene glycol.

5. The detection chip according to claim 1, wherein
a portion of a surface of the ventilative liquid-resistant layer covering the plurality of micro-pores and away from the micro-cavity-defining layer is communicated with the gas outlet.

6. The detection chip according to claim 5, further comprising:
an encapsulation spacer between the first substrate and the ventilative liquid-resistant layer, wherein
one end of the encapsulation spacer is in contact with the first substrate, and the other end of the encapsulation spacer is in contact with the ventilative liquid-resistant layer;
the micro-cavity-defining layer comprises a reaction region and a peripheral region surrounding the reaction region;
the plurality of micro-pores are in the reaction region; and
an orthographic projection of the encapsulation spacer on the micro-cavity-defining layer is in the peripheral region and is in a closed pattern surrounding the reaction region.

7. The detection chip according to claim 6, wherein an orthographic projection of the heating electrode on the base substrate does not overlap with the orthographic projection of the gas outlet on the base substrate, and the heating electrode is configured to heat the micro-pore.

8. The detection chip according to claim 7, wherein the first substrate further comprises:
a protective layer between the heating electrode and the encapsulation spacer, wherein an orthographic projection of the protective layer on the base substrate completely covers the orthographic projection of the heating electrode on the base substrate, and does not overlap with the orthographic projection of the gas outlet on the base substrate, and
the protective layer and the ventilative liquid-resistant layer are separated from each other.

9. The detection chip according to claim 7, wherein
the gas outlet has an aperture in a range of 0.5 mm to 1.5 mm,
the ventilative liquid-resistant layer has a thickness in a range of 0.05 mm to 0.15 mm;
the encapsulation spacer has a thickness in a range of 0.1 mm to 0.3 mm, and
a material of the ventilative liquid-resistant layer comprises polytetrafluoroethylene.

10. The detection chip according to claim 1, further comprising:
a second substrate on a side of the micro-cavity-defining layer away from the ventilative liquid-resistant layer;
a liquid sealing groove on a side of the second substrate close to the micro-cavity-defining layer; and
a liquid inlet and a liquid outlet at a bottom of the liquid sealing groove and extending through the second substrate,
wherein the plurality of micro-pores are communicated with the liquid inlet and the liquid outlet.

11. A manufacturing method for the detection chip according to claim 1, comprising:
forming the micro-cavity-defining layer and the ventilative liquid-resistant layer, respectively, wherein the plurality of micro-pores extending through the micro-cavity-defining layer are provided in the micro-cavity-defining layer; and the ventilative liquid-resistant layer is configured to allow gas to pass therethrough and to block liquid from passing therethrough; and
fixing the ventilative liquid-resistant layer on a side of the micro-cavity-defining layer, wherein the ventilative liquid-resistant layer completely covers openings of the plurality of micro-pores on a side of the plurality of micro-pores and thereby manufacturing the detection chip from claim 1.

12. The manufacturing method according to claim 11, wherein
after the step of forming the micro-cavity-defining layer and before the step of fixing the ventilative liquid-resistant layer on the side of the micro-cavity-defining layer, the manufacturing method further comprises:
forming a modification layer on the micro-cavity-defining layer; wherein the modification layer comprises: first portions covering side walls of the micro-pores and a second portion covering a side of the micro-cavity-defining layer, wherein the first portion has a surface energy greater than that of the second portion; and
in the step of fixing the ventilative liquid-resistant layer on the side of the micro-cavity-defining layer, the ventilative liquid-resistant layer is fixed on a side of the micro-cavity-defining layer away from the second portion.

13. The manufacturing method according to claim 12, wherein
the step of forming the modification layer on the micro-cavity-defining layer comprises:
forming a hydrophilic polymer film on a side of the micro-cavity-defining layer and the side walls of the micro-pores; and
forming an organic polymer on the hydrophilic polymer film on the side of the micro-cavity-defining layer, so that the hydrophilic polymer on the side of the micro-cavity-defining layer is grafted with the organic polymer.

14. The manufacturing method according to claim 13, wherein
the step of forming the hydrophilic polymer film on the side of the micro-cavity-defining layer and the side walls of the micro-pores comprises:
immersing the micro-cavity-defining layer in a hydrophilic polymer solution; and
taking the micro-cavity-defining layer out of the hydrophilic polymer solution, and drying the micro-cavity-defining layer, to form the hydrophilic polymer film on a surface of the micro-cavity-defining layer and the side walls of the micro-pores.

15. The manufacturing method according to claim 12, wherein
the step of forming the organic polymer on the hydrophilic polymer film on the side of the micro-cavity-defining layer comprises:
coating an organic polymer solution on a support substrate; and
placing a side of the micro-cavity-defining layer on the support substrate coated with the organic polymer solution, so that the hydrophilic polymer located on the side of the micro-cavity-defining layer is grafted with the organic polymer.

16. A sample introduction method for the detection chip according to claim 1, comprising:

injecting a sample solution into the plurality of micro-pores in the micro-cavity-defining layer of the detection chip of claim 1; and discharging residual gas in the plurality of micro-pores through the ventilative liquid-resistant layer.

17. The sample introduction method according to claim 16, wherein the detection chip comprises a second substrate;

a portion of a surface of the ventilative liquid-resistant layer covering the plurality of micro-pores and away from the micro-cavity-defining layer is communicated with the gas outlet; and the second substrate is on a side of the micro-cavity-defining layer away from the ventilative liquid-resistant layer, a liquid sealing groove is formed on a side of the second substrate close to the micro-cavity-defining layer, and a liquid inlet and a liquid outlet are at a bottom of the liquid sealing groove and extend through the second substrate; the micro-pores are communicated with the liquid inlet and the liquid outlet;

the step of injecting the sample solution into the plurality of micro-pores in the micro-cavity-defining layer comprises:

closing the gas outlet, opening the liquid inlet and the liquid outlet, and adding the sample solution through the liquid inlet, such that the solution reaches the liquid outlet; and the step of discharging residual gas in the plurality of micro-pores through the ventilative liquid-resistant layer comprises:

closing the liquid outlet, opening the gas outlet, and performing a gas pumping process through the gas outlet, so as to discharge the residual gas in the micro-pores through the ventilative liquid-resistant layer.

18. The sample introduction method according to claim 17, after the step of discharging the residual gas in the plurality of micro-pores through the ventilative liquid-resistant layer, further comprising:

closing the gas outlet, opening the liquid outlet, and adding an oil phase for liquid seal through the liquid inlet, such that the oil phase for liquid seal reaches the liquid outlet.

19. A detection chip, comprising:

a micro-cavity-defining layer having a plurality of micro-pores extending through the micro-cavity-defining layer; and a ventilative liquid-resistant layer on a side of the micro-cavity-defining layer and completely covering openings of the plurality of micro-pores on a side of the plurality of micro-pores, wherein the ventilative liquid-resistant layer is configured to allow gas to pass therethrough and to block liquid from passing therethrough, wherein the detection chip further comprises a first substrate on a side of the ventilative liquid-resistant layer away from the micro-cavity-defining layer, the first substrate comprises:

a base substrate having a gas outlet therein, a heating electrode on a side of the base substrate close to the ventilative liquid-resistant layer, a protective layer between the heating electrode and an encapsulation spacer, the encapsulation spacer being between the first substrate and the ventilative liquid-resistant layer, wherein an orthographic projection of the protective layer on the base substrate completely covers an orthographic projection of the heating electrode on the base substrate, and does not overlap with the orthographic projection of the gas outlet on the base substrate, and the protective layer and the ventilative liquid-resistant layer are separated from each other.

* * * * *